(12) United States Patent
Fujiwara et al.

(10) Patent No.: US 10,382,412 B2
(45) Date of Patent: Aug. 13, 2019

(54) LOCKING AND UNLOCKING SYSTEM AND KEY UNIT

(71) Applicant: TOYOTA JIDOSHA KABUSHIKI KAISHA, Toyota-shi (JP)

(72) Inventors: Yasuhisa Fujiwara, Miyoshi (JP); Yuichiro Haruna, Oyama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 139 days.

(21) Appl. No.: 15/629,782

(22) Filed: Jun. 22, 2017

(65) Prior Publication Data

US 2017/0374047 A1    Dec. 28, 2017

(30) Foreign Application Priority Data

Jun. 28, 2016   (JP) .................................. 2016-128203

(51) Int. Cl.
*H04L 9/32*       (2006.01)
*H04L 29/06*     (2006.01)
(Continued)

(52) U.S. Cl.
CPC ........ *H04L 63/061* (2013.01); *B60R 25/2018* (2013.01); *G07C 9/00309* (2013.01); *G07C 9/00571* (2013.01); *H04L 63/0853* (2013.01); *H04L 63/0869* (2013.01); *B60R 2325/101* (2013.01); *B60R 2325/103* (2013.01);
(Continued)

(58) Field of Classification Search
CPC ......... H04L 9/32; H04L 63/06; H04L 63/061; B60R 2325/00
See application file for complete search history.

(56) References Cited

U.S. PATENT DOCUMENTS

2006/0255910 A1    11/2006  Fukushima et al.
2007/0188310 A1*  8/2007  Mori ....................... B60R 25/24
                                                                    340/426.36
(Continued)

FOREIGN PATENT DOCUMENTS

DE    102012012389 A1    6/2012
DE    102014219502 A1    9/2014
(Continued)

*Primary Examiner* — Ponnoreay Pich
(74) *Attorney, Agent, or Firm* — Oblon, McClelland, Maier & Neustadt, L.L.P.

(57) ABSTRACT

A locking and unlocking system includes: a portable terminal; a key unit; and a locking and unlocking device of a vehicle or facilities. The portable terminal includes a first sending unit sending first authentication information to the key unit. The key unit includes: a first storage unit; a first authentication unit performing authentication based on the first authentication information; a decryption unit decrypting second authentication information when the authentication by the first authentication unit is successful; and a second sending unit sending the second authentication information to the locking and unlocking device. The locking and unlocking device includes: a second authentication unit performing authentication based on the second authentication information; and a locking and unlocking unit locking or unlocking the vehicle or the facilities when the authentication by the second authentication unit is successful.

11 Claims, 7 Drawing Sheets

(51) Int. Cl.
  *B60R 25/20* (2013.01)
  *G07C 9/00* (2006.01)
(52) U.S. Cl.
  CPC ............... *B60R 2325/205* (2013.01); *G07C 2009/00349* (2013.01); *G07C 2009/00769* (2013.01)

(56) References Cited

U.S. PATENT DOCUMENTS

| | | | |
|---|---|---|---|
| 2007/0265738 A1* | 11/2007 | Saito | B60N 2/0248 701/2 |
| 2007/0290793 A1* | 12/2007 | Tran | G07C 9/00309 340/5.64 |
| 2007/0294746 A1* | 12/2007 | Sasakura | B60R 25/2018 726/2 |
| 2015/0061828 A1 | 3/2015 | Fischer et al. | |
| 2015/0137943 A1 | 5/2015 | Nagel et al. | |
| 2016/0098870 A1 | 4/2016 | Bergerhoff et al. | |
| 2017/0053470 A1 | 2/2017 | Bergerhoff et al. | |
| 2017/0178035 A1* | 6/2017 | Grimm | H04L 63/061 |
| 2017/0344140 A1* | 11/2017 | Henderson | G06F 21/32 |
| 2017/0347266 A1* | 11/2017 | Petel | H04L 9/32 |

FOREIGN PATENT DOCUMENTS

| | | |
|---|---|---|
| JP | 2006-118122 | 5/2006 |
| JP | 2010-213185 | 9/2010 |
| JP | 2012-028854 A | 2/2012 |
| JP | 2013-124486 A | 6/2013 |
| JP | 2013-234519 | 11/2013 |
| JP | 2015-055107 A | 3/2015 |
| JP | 2015-169008 A | 9/2015 |
| JP | 2016-016835 A | 2/2016 |
| WO | WO2005/070733 A1 | 8/2005 |

* cited by examiner

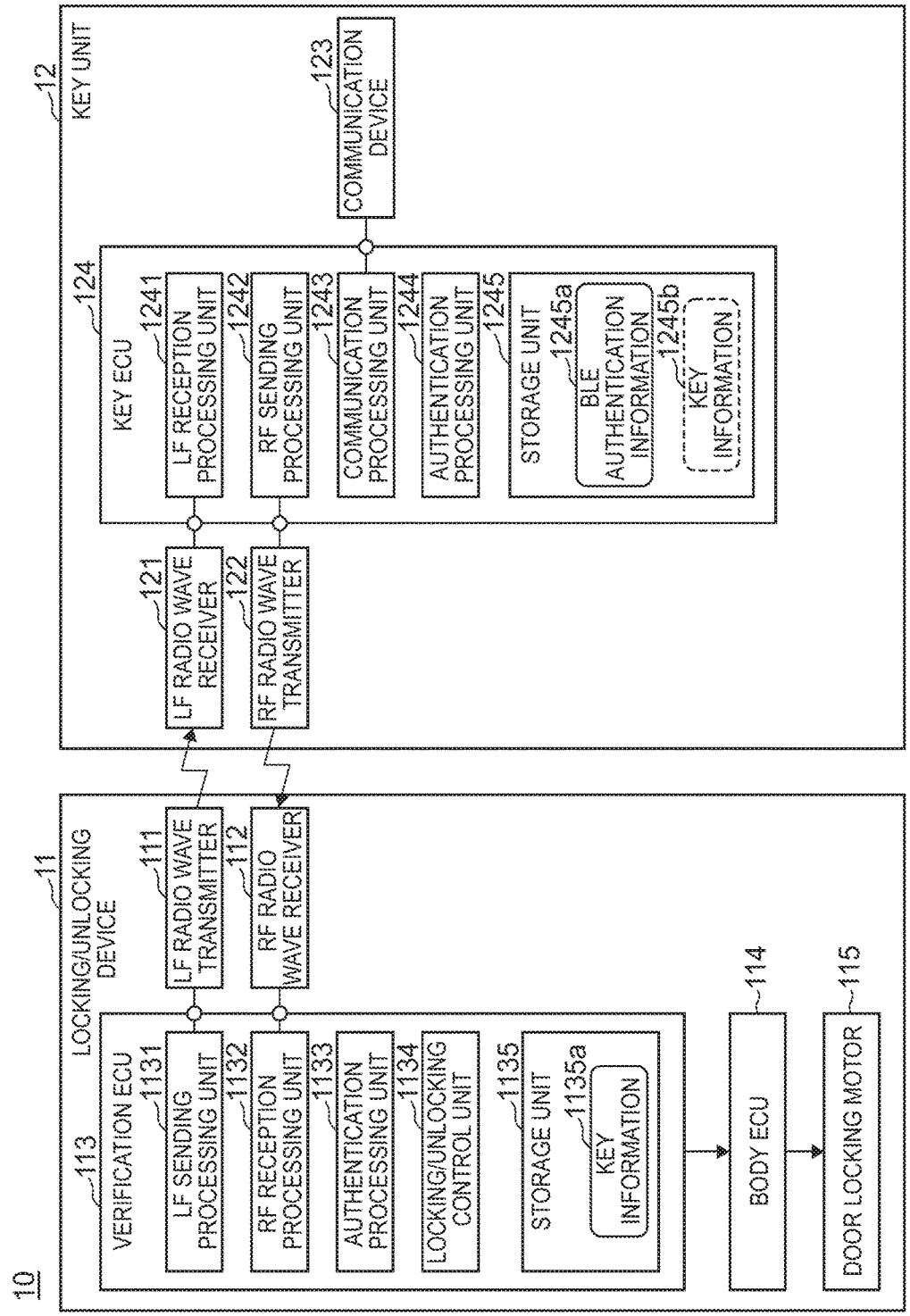

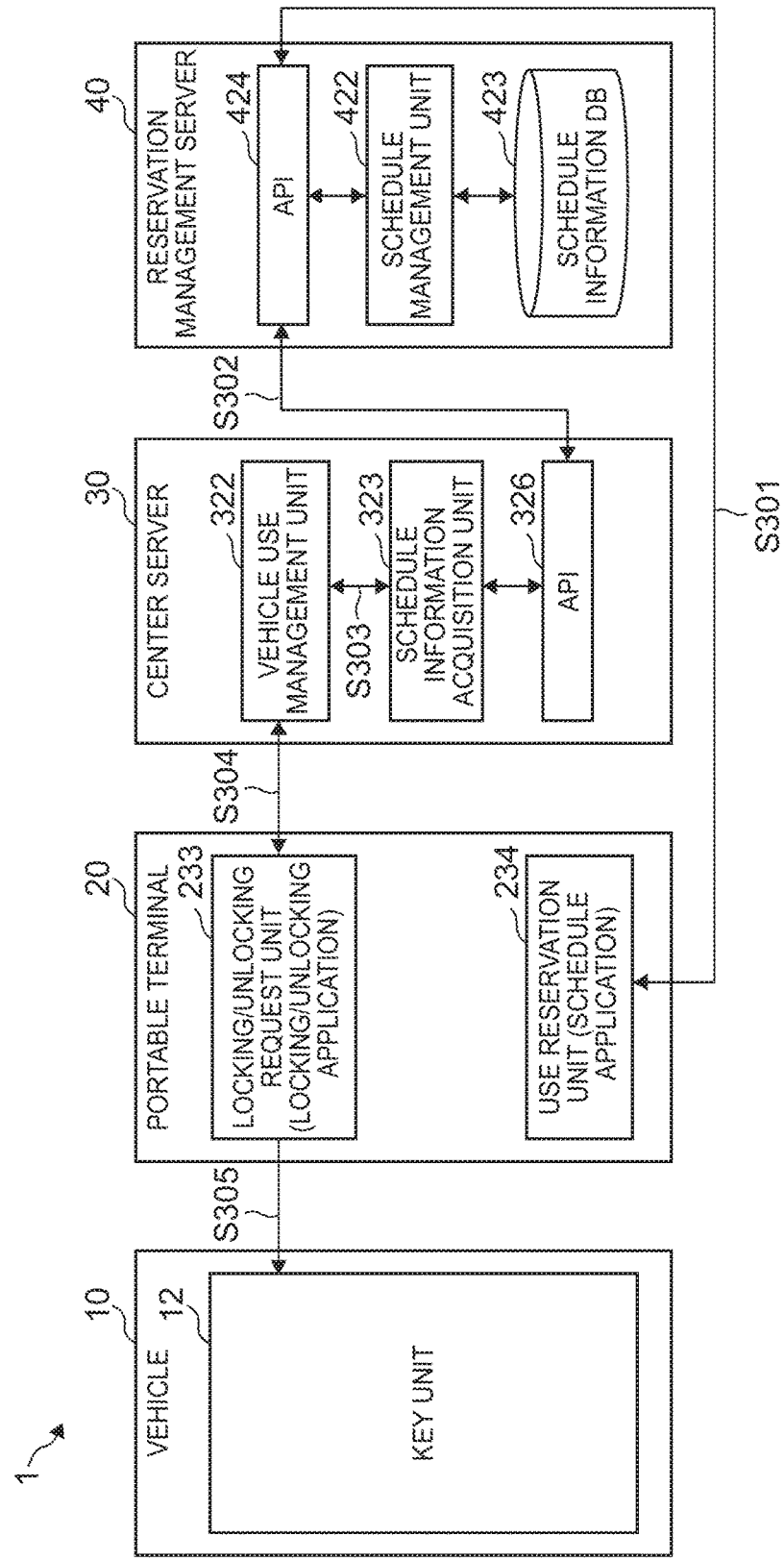

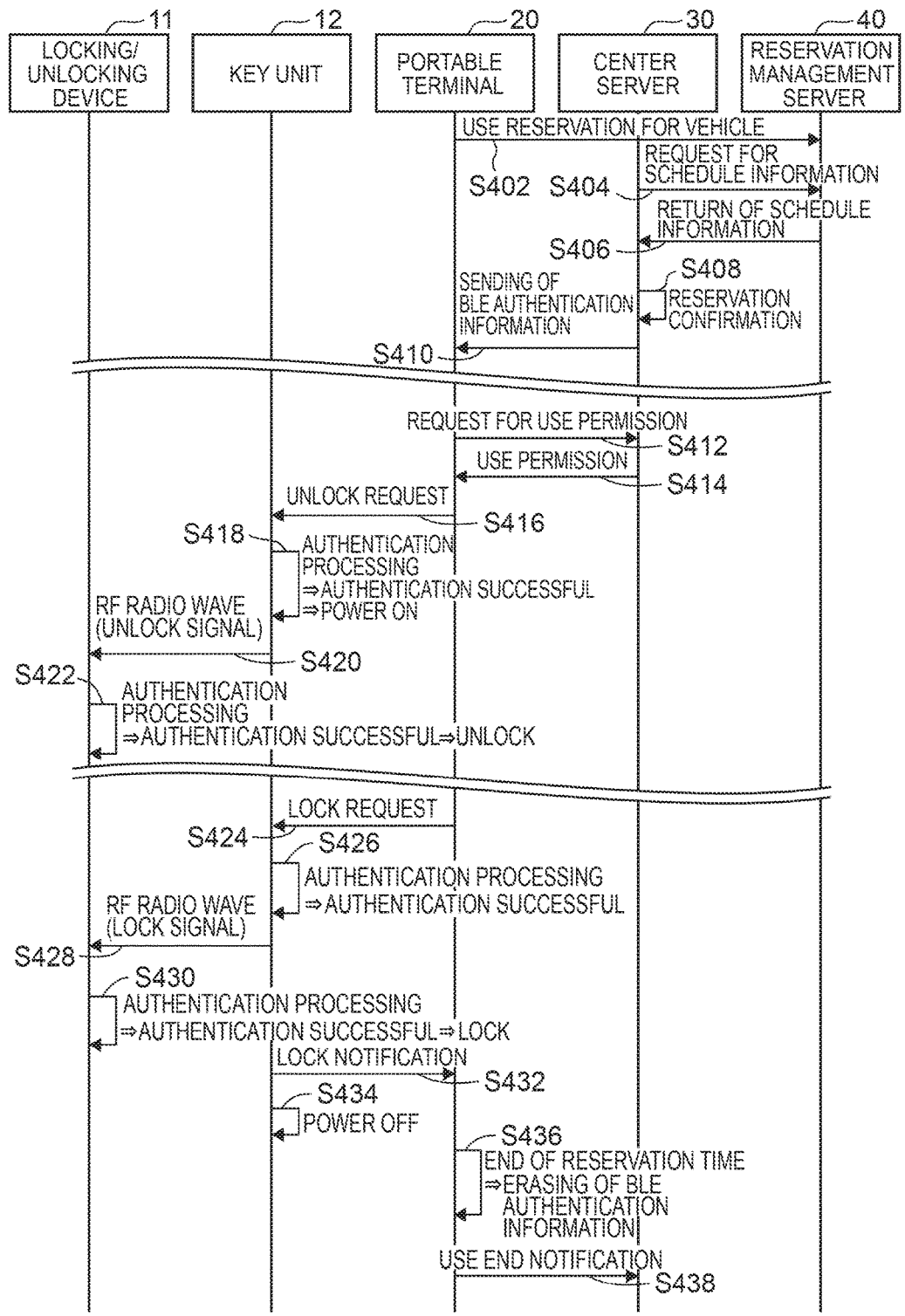

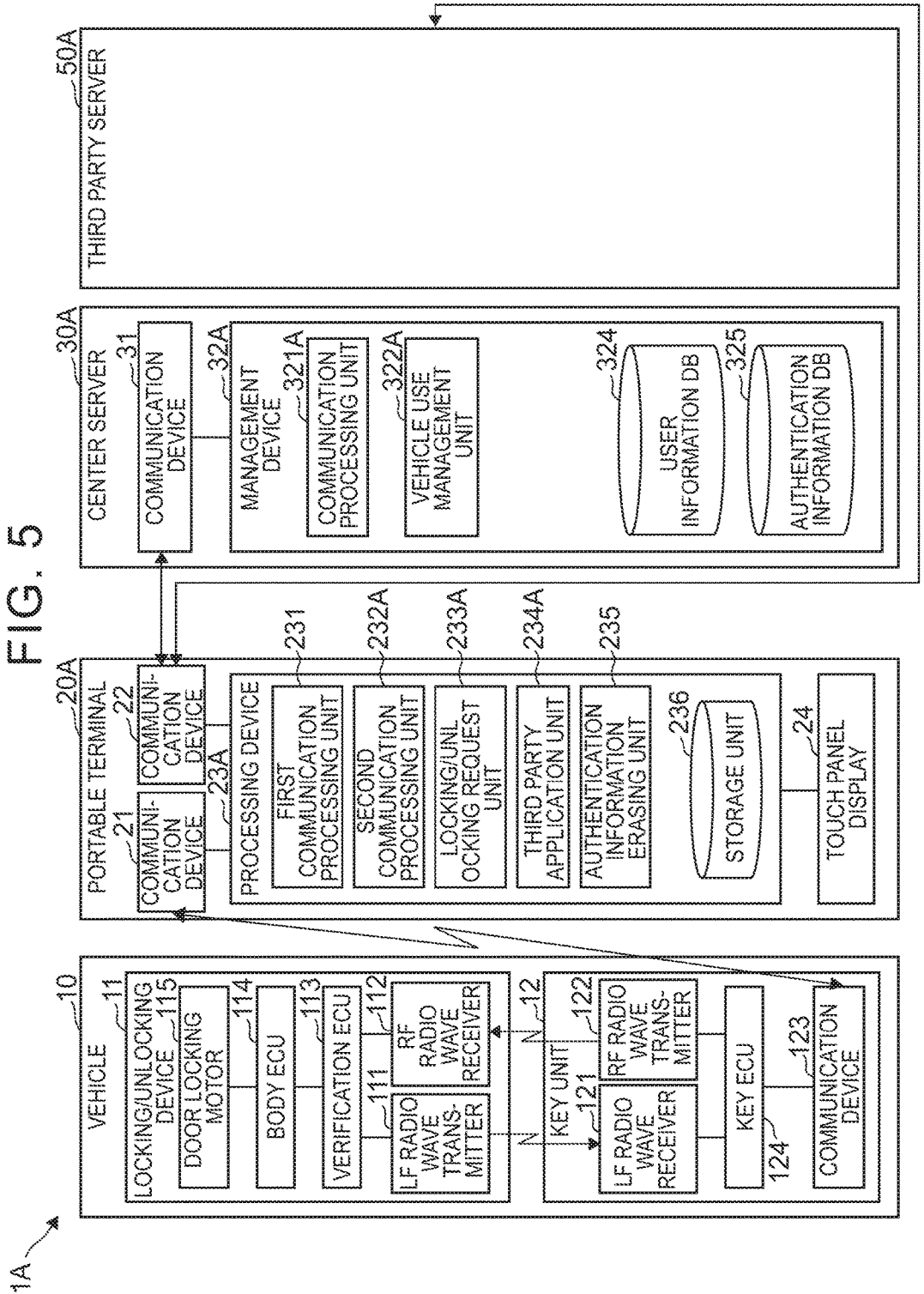

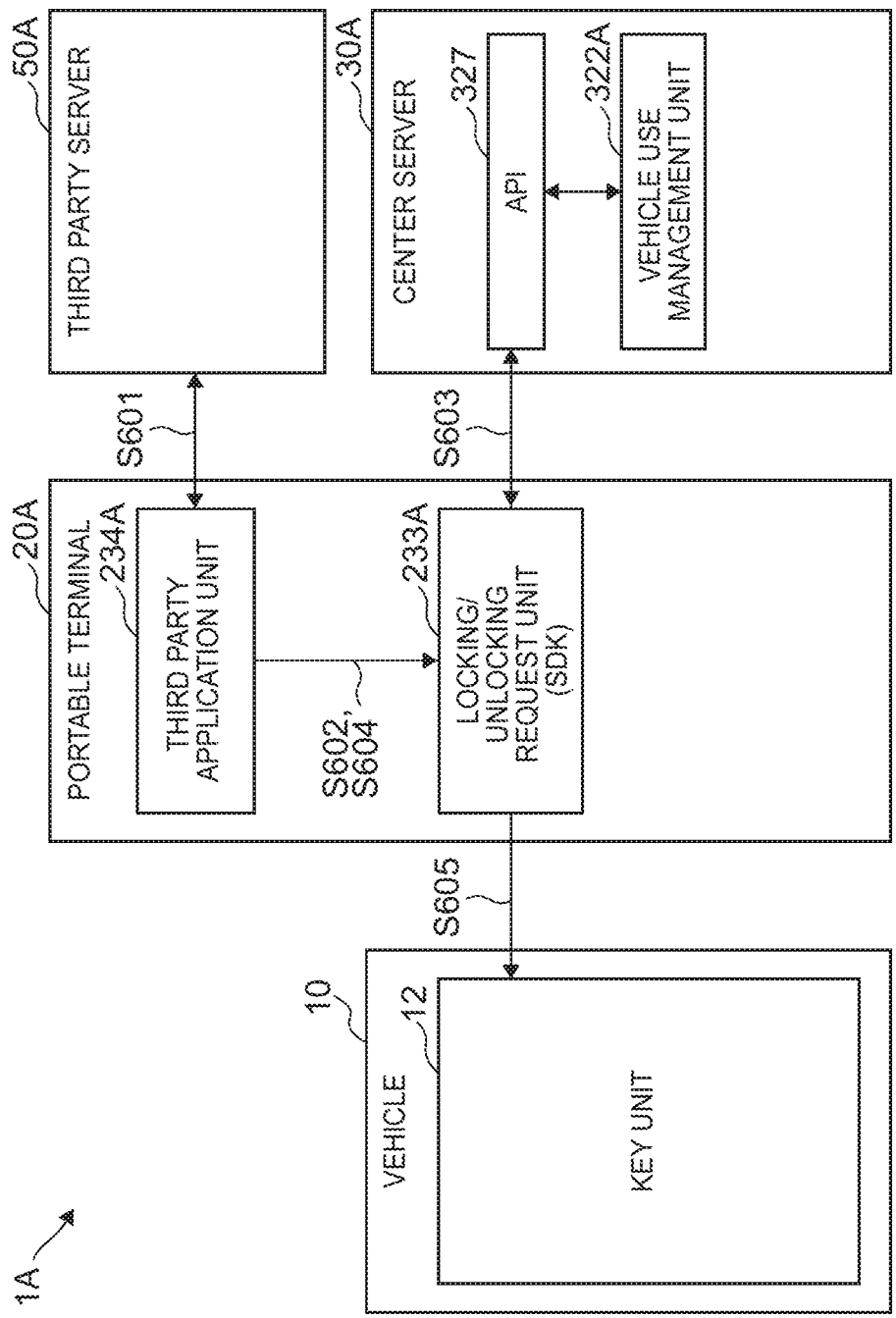

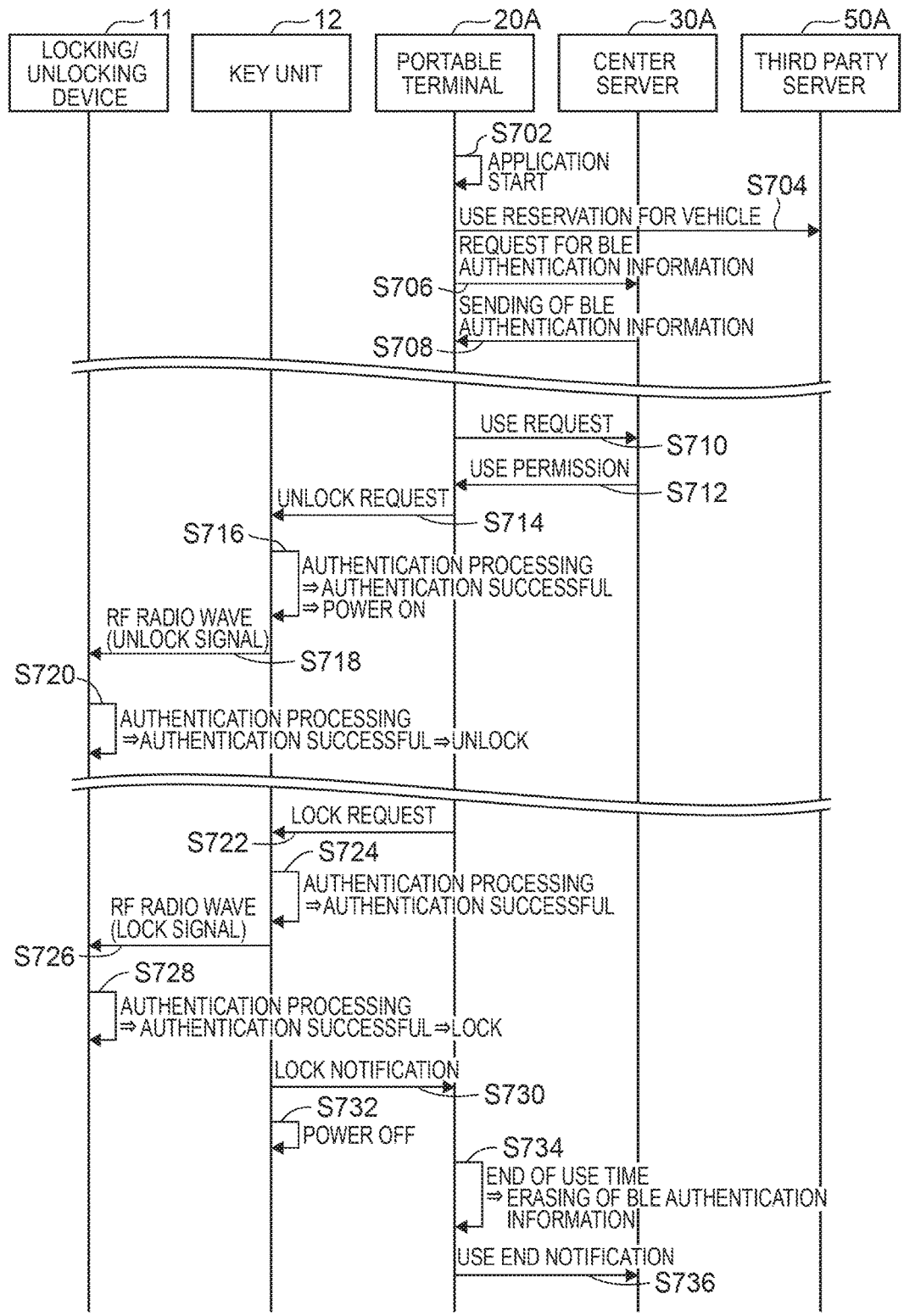

LOCKING AND UNLOCKING SYSTEM AND KEY UNIT

INCORPORATION BY REFERENCE

The disclosure of Japanese Patent Application No. 2016-128203 filed on Jun. 28, 2016 including the specification, drawings and abstract is incorporated herein by reference in its entirety.

BACKGROUND

1. Technical Field

The present disclosure relates to a locking and unlocking system and a key unit.

2. Description of Related Art

A key management system is disclosed in which a portable terminal can be used as an electronic key by receiving, by the portable terminal, authentication information for unlocking a vehicle, that is, key information uniquely set for the vehicle, from a server via a network (See, for example, Japanese Patent Application Publication No. 2006-118122 (JP 2006-118122 A)).

The use of such a configuration saves time and effort for handing over an electronic key when a plurality of users use the same vehicle, such as a rental car, a shared car, or a company car, in different time zones, thus improving user convenience.

A similar technique can be used for locking and unlocking the same facilities (for example, a conference room, recreation facilities, a gymnasium, etc.) that a plurality of users use in different time zones. Using a portable terminal as an electronic key for a locking and unlocking device installed in such facilities improves user convenience.

SUMMARY

However, when key information is managed integrally by a server, there is a possibility that a large amount of key information will be leaked to the outside world due to unauthorized access to the server. As a result, there is a possibility that the leaked key information will be misused and that vehicle theft or illegal entry into the associated facilities will occur.

The present disclosure provides a locking and unlocking system that can reduce vehicle theft or illegal entry into associated facilities when a plurality of users use the same vehicle or facilities in different time zones while at the same time improving user convenience.

A first aspect of the disclosure provides a locking and unlocking system. The locking and unlocking system according to the first aspect includes: a portable terminal; a key unit arranged inside a vehicle or facilities; and a locking and unlocking device installed in the vehicle or the facilities. The portable terminal includes a first sending unit configured to send a first request to the key unit. The first request includes first authentication information associated with the key unit. The key unit includes: a first receiving unit configured to receive the first request from the portable terminal; a first storage unit configured to store encrypted second authentication information, the second authentication information being associated with the vehicle or the facilities; a first authentication unit configured to perform authentication based on the first authentication information included in the first request when the first receiving unit receives the first request; a decryption unit configured to decrypt the second authentication information when the authentication by the first authentication unit is successful; and a second sending unit configured to send a second request to the locking and unlocking device, the second request including the second authentication information decrypted by the decryption unit. The locking and unlocking device includes: a second receiving unit configured to receive the second request from the key unit; a second authentication unit configured to perform authentication based on the second authentication information included in the second request, when the second receiving unit configured to receive the second request; and a locking and unlocking unit configured to lock or unlock the vehicle or the facilities when the authentication by the second authentication unit is successful.

In the first aspect of the disclosure, the locking and unlocking system may include a server configured to communicate with the portable terminal. The server may include: a second storage unit configured to store the first authentication information; a schedule information acquisition unit configured to acquire schedule information on the vehicle or the facilities; and a third sending unit configured to send the first authentication information to the portable terminal when the schedule information includes a use reservation for the vehicle or the facilities by a user of the portable terminal.

According to this embodiment, by reserving the use of the vehicle with the use of the portable terminal or another terminal, the user of that terminal can automatically acquire the first authentication information and, therefore, user convenience is improved.

In the first aspect of the disclosure, the portable terminal may include: a third storage unit configured to store the first authentication information; and an erasing unit configured to erase the first authentication information stored in the third storage unit, when a time of a use of the vehicle or the facilities ends.

According to this embodiment, the first authentication information stored in the portable terminal is erased when the use end date and time has elapsed. This prevents the user from unlocking the associated vehicle or facilities using the portable terminal after the end of use.

A second aspect of the disclosure provides a locking and unlocking system. The locking and unlocking system according to the second aspect includes: a portable terminal; a key unit arranged inside a vehicle or facilities; and a locking and unlocking device installed in the vehicle or the facilities. The portable terminal includes a first sending unit configured to send a first request to the key unit. The first request includes first authentication information associated with the key unit. The key unit includes: a first receiving unit configured to receive the first request from the portable terminal; a first storage unit configured to store second authentication information associated with the vehicle or the facilities; a first authentication unit configured to perform authentication based on the first authentication information included in the first request when the first receiving unit receives the first request; an access management unit configured to change the second authentication information in the first storage unit from an inaccessible state to an accessible state, when the authentication by the first authentication unit is successful; and a second sending unit configured to send a second request to the locking and unlocking device, the second request including the second authentication information. The locking and unlocking device includes: a second receiving unit configured to receive the second request from the key unit; a second authentication unit configured to perform authentication based on the second authentication information included in the second request, when the second receiving unit receives the second request; and a locking and unlocking unit configured to lock or unlock the vehicle or the facilities when the authentication by the second authentication unit is successful.

In the second aspect of the disclosure, the locking and unlocking system may include a server configured to communicate with the portable terminal. The server may include: a second storage unit configured to store the first authentication information; a schedule information acquisition unit configured to acquire schedule information on the vehicle or the facilities; and a third sending unit configured to send the first authentication information to the portable terminal when the schedule information includes a use reservation for the vehicle or the facilities by a user of the portable terminal.

According to this embodiment, by reserving the use of the vehicle with the use of the portable terminal or another terminal, the user of that terminal can automatically acquire the first authentication information and, therefore, user convenience is improved.

In the second aspect of the disclosure, the portable terminal may include: a third storage unit configured to store the first authentication information; and an erasing unit configured to erase the first authentication information stored in the third storage unit, when a time of a use of the vehicle or the facilities ends.

According to this embodiment, the first authentication information stored in the portable terminal is erased when the use end date and time has elapsed. This prevents the user from unlocking the associated vehicle or facilities using the portable terminal after the end of use.

According to the embodiment described above, the portable terminal sends the first request, which includes the first authentication information associated with the key unit, to the key unit, the key unit sends the second request, which includes the second authentication information associated with the vehicle or the facilities, to the locking and unlocking device when the authentication based on the first authentication information included in the received first request is successful, and the locking and unlocking device locks or unlocks the vehicle or the facilities when the authentication based on the second authentication information included in the received second request is successful. Therefore, by acquiring the first authentication information in advance, the user can lock or unlock the vehicle or the facilities using his or her own portable terminal, thus saving time and effort for handing over the electronic key and improving user convenience.

In addition, the second authentication information in the key unit associated with the vehicle or the facilities, that is, the key information unique to the vehicle or the facilities, is usually in an encrypted state or in an inaccessible state. Therefore, even if only the key unit is illegally acquired, it is difficult to use the key unit for locking and unlocking the vehicle or the facilities, reducing vehicle theft or illegal invasion into the associated facilities. In addition, the first authentication information, sent from the portable terminal to the key unit, is associated with the key unit, but not with the vehicle or the facilities. Therefore, even if the first authentication information is leaked, it is necessary to identify not only the correspondence between the first authentication information and the key unit but also the correspondence between the key unit and the vehicle or the facilities (which key unit is located in which vehicle or which facilities), thus reducing vehicle theft or illegal invasion into the associated facilities.

A third aspect of the disclosure provides a key unit. The key unit according to the third aspect includes a receiving unit configured to receive a first request from a portable terminal, the first request including first authentication information; a storage unit configured to store encrypted second authentication information, the second authentication information being associated with a vehicle or facilities; an authentication unit configured to perform authentication based on the first authentication information included in the first request when the receiving unit receives the first request; a decryption unit configured to decrypt the second authentication information when the authentication by the authentication unit is successful; and a sending unit configured to send a second request to a locking and unlocking device, the second request including the second authentication information decrypted by the decryption unit. The key unit is configured to send the second request to the locking and unlocking device in response to the first request. The key unit is arranged inside the vehicle or the facilities. The first request is sent from the portable terminal to lock or unlock the vehicle or the facilities. The locking and unlocking device is installed in the vehicle or the facilities. The second request requests the locking or the unlocking of the vehicle or the facilities.

In the third aspect of the disclosure, the key unit may be removable from the vehicle or the facilities.

A fourth aspect of the disclosure provides a key unit. The key unit according to the fourth aspect includes a receiving unit configured to receive a first request from a portable terminal, the first request includes first authentication information; a storage unit configured to store second authentication information; the second authentication information being associated with a vehicle or facilities; an authentication unit configured to perform authentication based on the first authentication information included in the first request when the receiving unit receives the first request; an access management unit configured to change the second authentication information in the storage unit from an inaccessible state to an accessible state when the authentication by the authentication unit is successful; and a sending unit configured to send a second request to a locking and unlocking device, the second request including the second authentication information. The key unit is configured to send the second request to the locking and unlocking device in response to the first request. The key unit is arranged inside the vehicle or the facilities. The first request is sent from the portable terminal to lock or unlock the vehicle or the facilities. The locking and unlocking device is installed in the vehicle or the facilities. The second request requests the locking or the unlocking of the vehicle or the facilities.

In the fourth aspect of the disclosure, the key unit may be removable from the vehicle or the facilities.

According to the embodiments described above, it is possible to provide a locking and unlocking system and a key unit that can reduce vehicle theft or illegal entry into the associated facilities when a plurality of users use the same vehicle or facilities in different time zones while at the same time improving user convenience.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a configuration diagram generally showing an example of a configuration of a locking/unlocking device and a key unit in the first embodiment;

FIG. 3 is a conceptual diagram conceptually showing an operation of the locking/unlocking system in the first embodiment;

FIG. 4 is a sequence diagram showing an example of an operation of the locking/unlocking system in the first embodiment;

FIG. 5 is a block diagram generally showing an example of a configuration of a locking/unlocking system in a second embodiment;

FIG. 6 is a conceptual diagram conceptually showing an operation of the locking/unlocking system in the second embodiment; and FIG. 7 is a sequence diagram showing an example of an operation of the locking/unlocking system in the second embodiment.

DETAILED DESCRIPTION OF EMBODIMENTS

Figure 1:
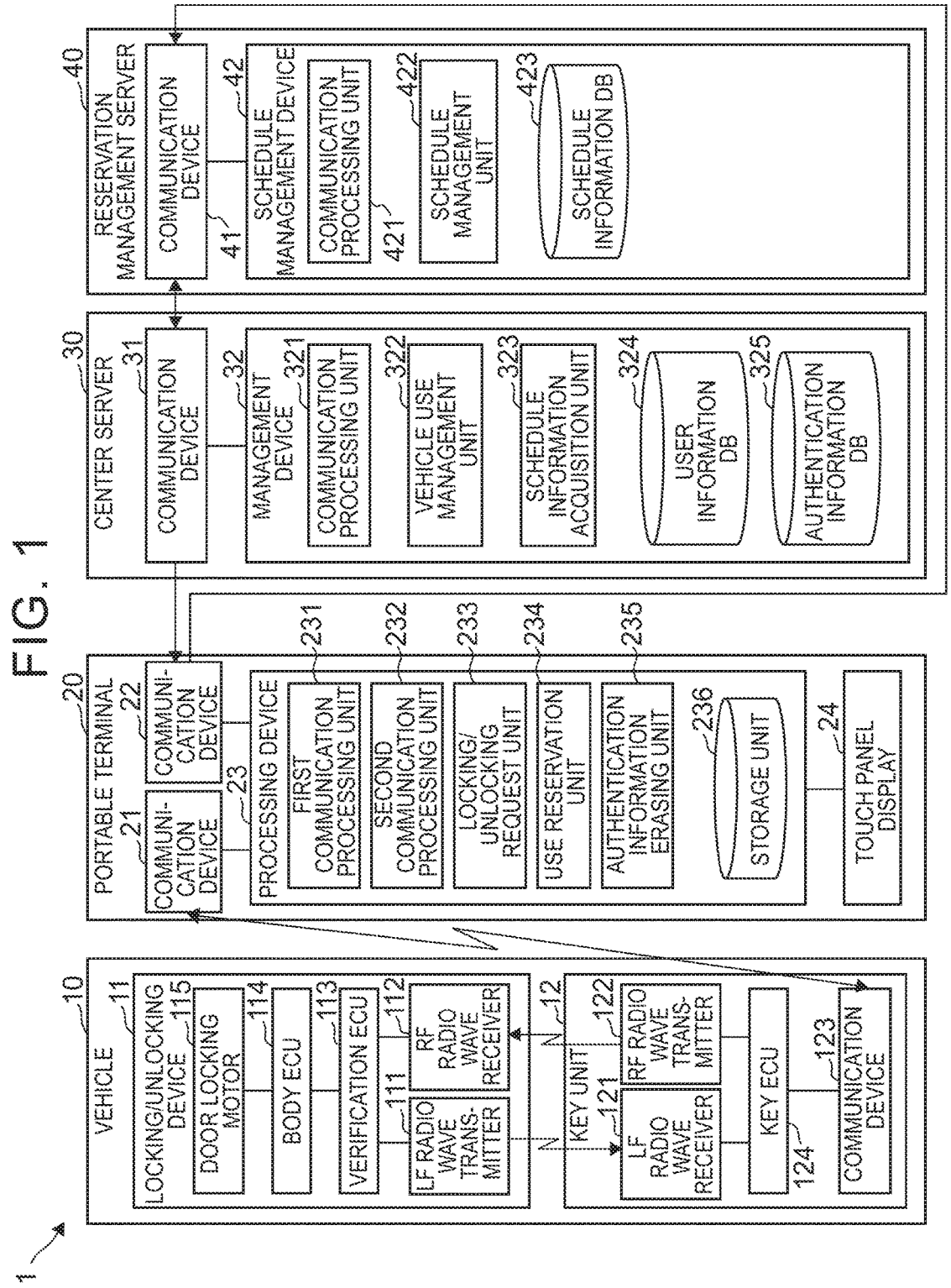
FIG. 1 is a block diagram generally showing an example of a configuration of a locking/unlocking system in a first embodiment.

Embodiments for carrying out the disclosure will be described below with reference to the drawings.

First Embodiment

First, with reference to FIG. 1 and FIG. 2, a configuration of a locking/unlocking system 1 according to this embodiment will be described.

FIG. 1 is a block diagram generally showing an example of a configuration of the locking/unlocking system 1 according to this embodiment. FIG. 2 is a block diagram generally showing an example of a configuration of a locking/unlocking device 11 and a key unit 12 included in a vehicle 10.

The locking/unlocking system 1 includes the vehicle 10, a portable terminal 20, a center server 30, and a reservation management server 40.

The vehicle 10 is a target for which locking/unlocking (locking and unlocking) is performed in the locking/unlocking system 1. The vehicle 10 includes the locking/unlocking device 11 and the key unit 12.

The vehicle 10 in this embodiment is assumed to be a vehicle that can be used by a plurality of users in different time zones, such as a rental car, a shared car (provided by either a business operator or an individual), or a company car in an organization.

The locking/unlocking device 11 locks and unlocks the door of the vehicle 10 in response to the lock signal and the unlock signal (both of which are an example of the second request) sent from the key unit 12 as radio waves in the Radio Frequency (RF: high frequency) band (for example, 300 MHz to 3 GHz) (hereinafter called "RF radio waves"). The locking/unlocking device 11 includes a Low Frequency (LF) radio wave transmitter 111, an RF radio wave receiver 112, a verification Electronic Control Unit (ECU) 113, a body ECU 114, and a door locking motor 115.

The locking/unlocking device 11 operates on electric power supplied from an auxiliary battery (not shown) mounted on the vehicle 10.

The LF radio wave transmitter 111, incorporated for example in the center console in the vehicle interior or in the door handle, sends radio waves in the LF band (for example, 30 Hz to 300 kHz) (hereinafter referred to as "LF radio waves") under the control of the verification ECU 113 (LF sending processing unit 1131 that will be described later).

The RF radio wave receiver 112, provided for example in the trim of the cargo room of the vehicle 10, receives RF radio waves under the control of the verification ECU 113 (RF reception processing unit 1132 that will be described later).

The verification ECU 113 is an electronic control unit that controls the locking and unlocking of the door of the vehicle 10 in response to the lock signal and the unlock signal received from the key unit 12. The verification ECU 113, which is for example configured mainly by a microcomputer, executes programs, stored in the ROM, on the CPU for implementing various control processing. The verification ECU 113 includes an LF sending processing unit 1131, an RF reception processing unit 1132, an authentication processing unit 1133, and a locking/unlocking control unit 1134 each as a functional unit implemented by executing one or more programs on the CPU. In addition, the verification ECU 113 includes a storage unit 1135 implemented as a storage area in the internal memory.

The LF sending processing unit 1131 sends LF radio waves to the vehicle interior and the vehicle exterior through the LF radio wave transmitter 111.

The RF reception processing unit 1132 (an example of the second receiving unit) receives RF radio waves through the RF radio wave receiver 112. More specifically, the RF reception processing unit 1132 receives the lock signal and the unlock signal sent from the key unit as the RF radio wave.

When the RF reception processing unit 1132 receives the lock signal or the unlock signal, the authentication processing unit 1133 (an example of the second authentication unit) performs authentication based on the key information (key information 1245b that will be described later) included in the lock signal or the unlock signal. More specifically, the authentication processing unit 1133 determines that the authentication is successful if key information 1135a, registered in advance in the storage unit 1135, and the key information, included in the lock signal or the unlock signal, match, and determines that the authentication is not successful if they do not match.

If the authentication processing unit 1133 succeeds in the authentication, the locking/unlocking control unit 1134 (an example of the locking/unlocking unit) sends the lock command (when the RF reception processing unit 1132 receives the lock signal) or the unlock command (when the RF reception processing unit 1132 receives the unlock signal) to the body ECU 114 through an in-vehicle network such as the Controller Area Network (CAN).

The body ECU 114 is an electronic control unit that controls the operation of the door locking motor 115 communicably connected through one-to-one communication lines. The body ECU 114 outputs the control command, which causes the door locking motor 115 to perform the locking operation, in response to the lock command from the verification ECU 113. In addition, the body ECU 114 outputs the control command, which causes the door locking motor 115 to perform the unlocking operation, in response to the unlock command from the verification ECU 113.

The door locking motor 115 is a known electric actuator for locking and unlocking the door (including the trunk lid, the back door, etc.) of the vehicle 10 in response to the control command from the body ECU 114.

The key unit 12, arranged inside the vehicle 10 (vehicle interior), sends the lock signal and the unlock signal to the locking/unlocking device 11 as RF radio waves in response to each of the lock request and the unlock request (both are an example of the first request) sent from the portable terminal 20. The key unit 12 includes an LF radio wave receiver 121, an RF radio wave transmitter 122, a communication device 123, and a key ECU 124.

The key unit 12 may be arranged at a position that is not visible from a user seated on each seat of the vehicle 10 (for example, inside the glove box or the center console box). In addition, the key unit 12 may or may not be fixed in the vehicle 10. Furthermore, the key unit 12 may be operated on the built-in button cell batteries or may be operated on electric power supplied from an auxiliary battery mounted on the vehicle 10.

The LF radio wave receiver 121 receives LF radio waves under the control of the key ECU 124 (LF reception processing unit 1241 that will be described later).

The RF radio wave transmitter 122 sends RF radio waves under the control of the key ECU 124 (RF sending processing unit 1242 that will be described later).

The communication device 123 is arbitrary device that communicates with the portable terminal 20 at a relatively short distance (a distance short enough for communication between the vehicle interior and the vehicle exterior) in conformity with a predetermined communication standard under the control of the key ECU 124. For example, the communication device 123 may be a Bluetooth (registered trademark) Low Energy (BLE) communication module that communicates with the portable terminal 20 in conformity with the BLE communication standard. The description will be continued below on the premise that the communication standard adopted in the communication device 123 conforms to the BLE communication.

The communication device 123 may also be a communication device conforming to a short-range communication standard (for example, Near Field Communication (NFC) standard) having a very short communicable distance. In this case, the communication device 123 may be built in a position close to the body surface outside the vehicle interior of the vehicle 10 (for example, inside the door handle). This allows the key unit 12 (the key ECU 124) to communicate with the portable terminal 20 in the vehicle exterior even when the communicable distance of the communication device 123 is very short.

The key ECU 124 is an electronic control unit that controls the transmission of the lock signal and the unlock signal to the locking/unlocking device 11 according to each of the lock request and the unlock request received from the portable terminal 20. The key ECU 124, which is for example configured mainly by a microcomputer, executes various programs, stored in the ROM, on the CPU for implementing various control processing. The key ECU 124 includes an LF reception processing unit 1241, an RF sending processing unit 1242, a communication processing unit 1243, and an authentication processing unit 1244 each as a functional unit implemented by executing one or more programs. In addition, the key ECU 124 includes a storage unit 1245 (an example of the first storage unit) implemented, for example, as a storage area of the internal memory.

The LF reception processing unit 1241 receives LF radio waves through the LF radio wave receiver 121. For example, the LF reception processing unit 1241 receives LF radio waves sent from the locking/unlocking device 11.

The RF sending processing unit 1242 (an example of the second sending unit) sends RF radio waves through the RF radio wave transmitter 122. For example, when the authentication processing unit 1244 succeeds in the authentication, the RF sending processing unit 1242 sends the lock signal (when the communication processing unit 1243 receives the lock request) or the unlock signal (when the communication processing unit 1243 receives the unlock request) each of which includes the key information 1245b that will be described later.

The communication processing unit 1243 (an example of the first receiving unit) communicates with the portable terminal 20 through the communication device 123. For example, the communication processing unit 1243 receives the lock request and the unlock request from the portable terminal 20 through the communication device 123. In addition, when the lock signal is sent from the RF sending processing unit 1242 to the locking/unlocking device 11 in response to the lock request from the portable terminal 20, the communication processing unit 1243 sends the notification (lock notification), which indicates that the vehicle 10 has been locked, to the portable terminal 20 in response to the request from the authentication processing unit 1244. This notification allows the portable terminal 20 to know that the vehicle 10 has been locked.

When the communication processing unit 1243 receives the lock request or the unlock request from the portable terminal 20, the authentication processing unit 1244 (an example of the first authentication unit) performs authentication based on the BLE authentication information (an example of the first authentication information) that is included in the lock request or the unlock request and is uniquely set for the key unit 12 in advance (that is, associated with the key unit 12). More specifically, the authentication processing unit 1244 determines that the authentication is successful if the BLE authentication information 1245a, registered in advance in the storage unit 1245, and the BLE authentication information, included in the lock request or the unlock request, match, and determines that the authentication is not successful if they do not match.

In addition, if the authentication corresponding to the unlock request received by the communication processing unit 1243 is successful, the authentication processing unit 1244 turns on the power of the key unit 12. After that, the authentication processing unit 1244 sends the sending request to the RF sending processing unit 1242 to send the unlock signal to the locking/unlocking device 11.

In addition, if the authentication corresponding to the lock request received by the communication processing unit 1243 is successful, the authentication processing unit 1244 sends the sending request to the RF sending processing unit 1242 to send the lock signal to the locking/unlocking device 11 and, after that, sends the sending request to the communication processing unit 1243 to send the lock notification to the portable terminal 20. After that, authentication processing unit 1244 turns off the power of the key unit 12.

Even when the power of the key unit 12 is OFF, the functions of the units that consume a very small amount of power, such as the communication processing unit 1243 and the authentication processing unit 1244, are still available for use. When the power of the key unit 12 is switched from OFF to ON, the units that consume a large amount of power, such as the LF radio wave receiver 121 and the RF radio wave transmitter 122, become available for use.

In addition, if the authentication is successful, the authentication processing unit 1244 (an example of the decryption unit and the access management unit) restores the key information 1245b, stored in the storage unit 1245, to the usable state. For example, the key information 1245b, which is in the inaccessible state or the encrypted state, is stored in the state not usable for the authentication by the locking/unlocking device 11. Therefore, if the authentication is successful, the authentication processing unit 1244 changes the access right for accessing the storage unit 1245 so that the key information 1245b becomes accessible or decrypts the encrypted key information 1245b based on the BLE authentication information. This processing allows the RF sending processing unit 1242 to access the key information 1245b, which is not usually accessible, and send the lock signal and the unlock signal, each of which includes the key information 1245b, to the locking/unlocking device 11, or to send the lock signal and the unlock signal, each of which includes the decrypted key information 1245b, to the locking/unlocking device 11. Therefore, the locking/unlocking device 11 (more specifically, the authentication processing unit 1133) can perform authentication appropriately based on the key information 1245b included in the lock signal and unlock signal. In addition, even if a malicious third party illegally obtains the key unit 12, the theft of the vehicle 10 can be prevented because the key information 1245b in the key unit 12 is not accessible or is encrypted.

The portable terminal 20 is, for example, a smartphone, a tablet terminal, or the like. The portable terminal 20 can bi-directionally communicate with the center server 30 and the reservation management server 40 through a predetermined communication network (for example, a mobile phone network with many base stations as its terminals, the Internet, etc.). The portable terminal 20 includes communication devices 21 and 22, a processing device 23, and a touch panel display (hereinafter simply referred to as a display) 24.

The communication device 21 is an arbitrary device that communicates with the key unit 12 according to the same communication standard as that of the communication device 123. For example, the communication device 21 is a BLE communication module.

The communication device 22 is an arbitrary device that communicates with the center server 30 and the reservation management server 40 through a predetermined communication network.

The processing device 23, which includes a CPU, an auxiliary storage device, and the like, includes a first communication processing unit 231, a second communication processing unit 232, a locking/unlocking request unit 233, a use reservation unit 234, and an authentication information erasing unit 235 each as a functional unit implemented by executing one or more programs on the CPU. In addition, the processing device 23 includes a storage unit 236 implemented as a storage area in the auxiliary storage device.

The first communication processing unit 231 uses the communication device 21 to wirelessly communicate with the key unit 12 for sending and receiving various signals. For example, the first communication processing unit 231 sends the lock signal and the unlock signal to the key unit 12 in response to a request from the locking/unlocking request unit 233.

The second communication processing unit 232 uses the communication device 22 to wirelessly communicate with a base station for sending and receiving various signals such as data signals and control signals. In this embodiment, the second communication processing unit 232 sends and receives various signals to and from the center server 30 and the reservation management server 40 through a predetermined communication network including a mobile phone network with base stations as its terminals and the Internet. For example, the second communication processing unit 232 receives the signal that includes the BLE authentication information and that is sent from the center server 30 to the portable terminal 20. The BLE authentication information received by the second communication processing unit 232 is stored in the storage unit 236 (an example of the third storage unit). In addition, in response to a request from the locking/unlocking request unit 233, the second communication processing unit 232 sends the signal that requests permission to use the vehicle 10 to the center server 30 and, at the same time, receives the signal (use permission signal) that permits the use of the vehicle 10 from the center server 30. The "use of vehicle 10" includes an operation to unlock the vehicle 10, to get on the vehicle 10, to turn on the ignition switch of the vehicle 10, and to drive the vehicle 10 for traveling. In addition, in response to a request from the use reservation unit 234, the second communication processing unit 232 sends the signal that requests the disclosure of schedule information on the vehicle 10 to the reservation management server 40 and, at the same time, receives schedule information (reference data) on the vehicle 10 from the reservation management server 40. In addition, in response to a request from the use reservation unit 234, the second communication processing unit 232 sends the signal that requests the update of the schedule information on the vehicle 10 and, at the same time, receives a reply, indicating that schedule information on the vehicle 10 has been updated, from the reservation management server.

The locking/unlocking request unit 233 causes the display 24 to display the Graphical User Interface (GUI) as an operation screen. The locking/unlocking request unit 233 sends the lock request that includes the BLE authentication information, or the unlock request that includes BLE authentication information, to the key unit 12 via the first communication processing unit 231 in response to a predetermined operation on the GUI. For example, the Lock button for requesting the locking of the vehicle 10 and the Unlock button for requesting the unlocking of the vehicle 10 are drawn on the GUI. On this GUI, the lock request is sent by touching the Lock button and the unlock request is sent by touching the Unlock button.

The operation for sending the lock request and the unlock request to the key unit 12 may be an operation on the operation unit of the hardware provided in the portable terminal 20, instead of the touch operation on the display 24. In addition, if the BLE authentication information is not stored in the storage unit 236 (that is, if the BLE authentication information is not yet received from the center server 30, or if the BLE authentication information is already erased by the authentication information erasing unit 235), the BLE authentication information is not included in the lock signal and unlock signal. Therefore, even if the lock signal and the unlock signal not including the BLE information are sent to the key unit 12, the door of the vehicle 10 cannot be locked and unlocked. In addition, if the BLE authentication information is not stored in the storage unit 236, it is also possible not to send the lock signal and the unlock signal.

In addition, at the start of using the vehicle 10 (before unlocking the vehicle 10 for the first time), the locking/unlocking request unit 233 sends the signal that includes the position information on the portable terminal 20 and requests permission to use the vehicle 10, to the center server 30 via the second communication processing unit 232 in response to a predetermined operation by the user on the GUI. This allows a vehicle use management unit 322 of the center server 30 to receive the signal and, based on the position information on the portable terminal 20 included in the signal, to confirm that the user has arrived at the parking position of the vehicle 10. After that, the vehicle use management unit 322 confirms that the current date and time is immediately before the use start date and time of the vehicle 10 or within the use reservation date and time and, then, sends the use permission signal to the portable terminal 20.

If it is determined that the user has arrived at the parking position of the vehicle 10 and that the current date and time is immediately before the use start date and time of the vehicle 10 or within the use reservation date and time, the locking/unlocking request unit 233 may automatically send the signal that requests use permission for the vehicle 10 to the center server 30. In addition, the portable terminal 20, which has the GPS positioning function and the base station positioning function both of which are known, can acquire the position information on the portable terminal 20 using the positioning function.

The use reservation unit 234 causes the display 24 to display the GUI as an operation screen and reserves the use of the vehicle 10 in response to a user's predetermined operation on the GUI of the display 24. For example, via the second communication processing unit 232, the use reservation unit 234 requests the reservation management server 40 to send the schedule information on the vehicle 10 (current reservation status). At this time, the use reservation unit 234 sends a request that includes the identification information and the password, unique to the vehicle 10, to the reservation management server 40. The schedule information on the vehicle 10, stored in the reservation management server 40 (more specifically, a schedule information DB 423 that will be described later), includes the reservation information on the vehicle 10 (date and time, use time, identification information on the user who will use the vehicle, etc. of each use reservation). In addition, the use reservation unit 234 causes the display 24 to display the schedule information on the vehicle 10 (current reservation status), received from the reservation management server 40, via the second communication processing unit 232. This display allows the user to confirm unoccupied time slots based on the schedule information displayed on the display and to select an unoccupied time slot (non-reserved time slot) of the vehicle 10 for reservation. In addition, when the user has made a reservation for a specific date and time, the use reservation unit 234 requests the reservation management server 40 via the second communication processing unit 232 to update the schedule information to the schedule information that includes the newly-entered reservation information (use reservation date and time, use time, user identification information, etc.). As a result, the new use reservation entered by the user of the portable terminal 20 is reflected in the schedule information on the vehicle 10 stored in the schedule information DB 423.

The use reservation for the vehicle 10 may be made from a terminal other than the portable terminal 20 (for example, a PC connectable to the reservation management server 40 through a predetermined communication network).

The authentication information erasing unit 235 (an example of the erasing unit) erases the BLE authentication information, received from the center server 30 via the second communication processing unit 232, from the storage unit 236. For example, when the use end date and time of the vehicle 10 has elapsed, the authentication information erasing unit 235 erases the BLE authentication information. This prevents the user of the portable terminal 20 from being able to use the vehicle 10 on a date/time other than the use reservation date/time.

The authentication information erasing unit 235 can confirm the use end date and time of the vehicle 10 based on the use date and time expiration information that is sent with the BLE authentication information from the center server 30. In addition, the authentication information erasing unit 235 may obtain the reservation information on the use reservation for the vehicle 10, entered by the user of the portable terminal 20, from the reservation management server 40 via the use reservation unit 234 for confirming the use end date and time of the vehicle 10.

The center server 30 manages the use status of the vehicle 10. The center server 30 includes a communication device 31 and a management device 32.

The communication device 31 is an arbitrary device that communicates with the portable terminal 20 and the reservation management server 40 through a predetermined communication network.

The management device 32, configured mainly by one or more computers, includes a communication processing unit 321, the vehicle use management unit 322, and a schedule information acquisition unit 323 each as a functional unit implemented by executing one or more programs on the CPU. In addition, the management device 32 includes a user information DB 324 and an authentication information DB 325 both of which are stored in the internal auxiliary storage device.

The communication processing unit 321 uses the communication device 31 to send and receive various signals to and from the portable terminal 20 and the reservation management server 40. For example, the communication processing unit 321 sends the signal that includes the BLE authentication information to the portable terminal 20 in response to a request from the vehicle use management unit 322. In addition, the communication processing unit 321 receives the signal that requests permission to use the vehicle 10 from the portable terminal 20 and, in response to a request from the vehicle use management unit 322 corresponding to that signal, sends the use permission signal of the vehicle 10 to the portable terminal 20. In addition, in response to a request from the schedule information acquisition unit 323, the communication processing unit 321 sends the signal that requests the disclosure of the schedule information on the vehicle 10 to the reservation management server 40 and, at the same time, receives the schedule information on vehicle 10 from the reservation management server 40.

The vehicle use management unit 322 sends the BLE authentication information to the portable terminal 20 of the user, who has made a use reservation, via the communication processing unit 321 based on the schedule information on the vehicle 10 acquired by the schedule information acquisition unit 323. For example, the vehicle use management unit 322 compares the user identification information, included in the reservation information on each use reservation, with the user identification information, included in the user information DB 324, to identify the user and the portable terminal 20 of the user. In addition, the vehicle use management unit 322 extracts the BLE authentication information, corresponding to the key unit 12 mounted on the vehicle 10, from the authentication information DB 325 in which the BLE authentication information is stored in such a way that it is associated with the identification information unique to the key unit 12. In addition, the vehicle use management unit 322 extracts the use end date and time based on the reservation information. After that, the vehicle use management unit 322 sends the signal that includes the BLE authentication information and the use date and time expiration information on the BLE authentication information (use end date and time of the vehicle 10) to the portable terminal 20 of the identified user via the communication processing unit 321.

The schedule information acquisition unit 323 periodically connects to the reservation management server 40 to acquire the schedule information on the vehicle 10. For example, at predetermined time intervals, the schedule information acquisition unit 323 sends the signal that requests the disclosure of the schedule information on the vehicle 10 via the communication processing unit communication processing unit 321. As a result, the schedule information acquisition unit 323 can acquire the schedule information (reference data) on the vehicle 10 from the reservation management server 40 (schedule information DB 423) via the communication processing unit 321.

The user information DB 324 stores the identification information on each pre-registered user, who will use the vehicle 10, and the corresponding password.

The authentication information DB 325 stores the BLE authentication information associated with the identification information unique to the key unit 12.

The reservation management server 40 manages the schedules of pre-registered objects (persons, objects including vehicles, facilities). In this embodiment, the reservation management server 40 is a general-purpose schedule management server. For example, the reservation management server 40 stores cloud application programs not shown. The user executes a cloud application program on the portable terminal 20 or another terminal via a predetermined communication network, such as a mobile phone network or the Internet, to create and update the schedule information using the cloud application.

The reservation management server 40 may be managed either by an organization (user's own organization) that provides the programs for implementing the locking/unlocking request unit 233 and manages the center server 30 or by an organization other than the user's own organization (third party). In addition, the reservation management server 40 may be a dedicated schedule management server for managing the schedule of the vehicle 10. Furthermore, the schedule of an object, which include a vehicle, and facilities represents the use plan (use reservation) of the object and facilities.

The reservation management server 40 includes a communication device 41 and a schedule management device 42.

The communication device 41 is an arbitrary device that communicates with the portable terminal 20 and the center server 30 through a predetermined communication network.

The schedule management device 42, configured mainly by one or more computers, includes a communication processing unit 421 and a schedule management unit 422 each as a functional unit implemented by executing one or more programs on the CPU. In addition, the schedule management device 42 includes a schedule information DB 423 stored in the internal auxiliary storage device, and the schedule information DB 423 includes the schedule information on the vehicle 10.

The communication processing unit 421 uses the communication device 41 to send and receive various signals to and from the portable terminal 20 and the center server 30. For example, the communication processing unit 421 receives the signal that requests the disclosure of the schedule information on the vehicle 10 from the portable terminal 20 and, in response to a request from the schedule management unit 422 corresponding to that signal, returns the schedule information (reference data) on the vehicle 10 to the portable terminal 20. In addition, the communication processing unit 421 receives the signal that requests the update of the schedule information from the portable terminal 20 and, in response to a request from the schedule management unit 422 corresponding to that signal, returns the signal that indicates the completion of the update to the portable terminal 20. In addition, the communication processing unit 421 receives the signal that requests the disclosure of the schedule information on the vehicle 10 from the center server 30 and, in response to a request from the schedule management unit 422 corresponding to that signal, returns the schedule information (reference data) on vehicle 10 to the center server 30.

The schedule management unit 422 manages the schedule of each pre-registered object (persons, objects including vehicles, facilities, etc.) in response to various inputs by the user using the above-described cloud applications. In this embodiment, the vehicle 10 is pre-registered as the management target of the schedule management unit 422, and the schedule management unit 422 manages the schedule information on the vehicle 10 stored in the schedule information DB 423. When the communication processing unit 421 receives the signal that requests the disclosure of the schedule information on the vehicle 10 from the portable terminal 20 (or from another terminal when the use reservation for the vehicle 10 is made by the other terminal), the schedule management unit 422 first determines whether the access is an authorized access based on the identification information and the password included in the signal. If it is determined that the access is an authorized access, the schedule management unit 422 obtains the schedule information on the vehicle 10 from the schedule information DB 423 and sends the obtained schedule information to the portable terminal 20 (or to another terminal) via the communication processing unit 421. In addition, when the communication processing unit 421 receives the signal that includes a request to update the schedule information on the vehicle 10 from the portable terminal 20 (or from another terminal), the schedule management unit 422 updates the schedule information on the vehicle 10 in the schedule information DB 423 according to the content of the request (that is, the update contents including the added reservation information). In addition, when the communication processing unit 421 receives the signal that requests the disclosure of the schedule information on the vehicle 10 from the center server 30, the schedule management unit 422 determines whether the access is an authorized access based on the identification information and the password included in the signal in the same manner as when a request is received from the portable terminal 20. If the access is an authorized access, the schedule management unit 422 obtains the schedule information on the vehicle 10 from the schedule information DB 423 and sends the obtained schedule information to the center server 30 via the communication processing unit 421.

Next, with reference to FIG. 3, an outline of the operation of locking/unlocking system 1 in this embodiment will be described.

FIG. 3 is a conceptual diagram that conceptually shows the operation of the locking/unlocking system 1 in this embodiment (the flow from the use reservation for the vehicle 10 to the locking and unlocking of the door of the vehicle 10).

In FIG. 3, in order to conceptually describe the exchange of signals among the main components, the hardware (communication devices 21, 22, 31, and 41) and the software (first communication processing unit 231, second communication processing unit 232, communication processing units 321 and 421) for implementing the communication function are omitted.

First, in step S301, the use reservation unit 234 of the portable terminal 20 (for example, the schedule application installed in the portable terminal 20) makes a use reservation for the vehicle 10 in response to a user operation on the GUI displayed on the display 24.

The use reservation unit 234 uses the above-described cloud application, included in the reservation management server 40, to send the signal that requests the disclosure of the schedule information on the vehicle 10 to the reservation management server 40. At this time, the use reservation unit 234 uses the Application Programming Interface (API) 424, which calls the schedule management unit 422, to make a request according to the procedure/specification of the API 424. As a result, the schedule management unit 422 is called from the API 424. The schedule management unit 422 retrieves the schedule information on the vehicle 10 from the schedule information DB 423 and returns the schedule information (reference data) on the vehicle 10 to the portable terminal 20 using the API 424.

Likewise, when the user makes a new use reservation for the vehicle 10 through the GUI on the display 24, the use reservation unit 234 sends the signal that requests the update of the schedule of the vehicle 10 to the reservation management server 40 using the same API 424. As a result, the schedule management unit 422 is called from the API 424. The schedule management unit 422 updates the schedule information on the vehicle 10, stored in the schedule information DB 423, to the contents that includes the reservation information on the new use reservation and, then, completes the new use reservation for the vehicle 10 requested by the user of the portable terminal 20. After that, the schedule management unit 422 uses the API 424 to return the signal that indicates the completion of the update to the portable terminal 20.

Next, in step S302, the schedule information acquisition unit 323 of the center server 30 acquires the schedule information on the vehicle 10, which has been updated by the user of the portable terminal 20 to the contents including the new use reservation, when periodically connecting to the reservation management server 40.

The schedule information acquisition unit 323 uses the API 424 to send the signal that requests the disclosure of the schedule information on the vehicle 10 to the reservation management server 40. As a result, the schedule management unit 422 is called from the API 424. The schedule management unit 422 retrieves the schedule information on the vehicle 10 from the schedule information DB 423, and the reservation management server 40 returns the schedule information (reference data) on the vehicle 10 to the center server 30. At this time, the reservation management server 40 uses the API 326 that calls the schedule information acquisition unit 323. As a result, the schedule information acquisition unit 323 is called from the API 326, and the schedule information acquisition unit 323 can acquire the schedule information (reference data) on the vehicle 10.

Next, in step S303, the vehicle use management unit 322 of the center server 30 confirms the schedule information on the vehicle 10 acquired by the schedule information acquisition unit 323. As a result, the vehicle use management unit 322 can know that the schedule information on the vehicle 10 includes the new reservation information entered by the user of the portable terminal 20.

Next, in step S304, the center server 30 (vehicle use management unit 322) sends the BLE authentication information, corresponding to the key unit 12 arranged inside the vehicle 10, to the portable terminal 20. As described above, the BLE authentication information received by the portable terminal 20 is stored in the storage unit 236 of the portable terminal 20.

Next, in step S305, the locking/unlocking request unit 233 (for example, a locking/unlocking application installed in the portable terminal 20) sends the lock request or the unlock request that includes the BLE authentication information to the key unit 12 in response to the user operation on the GUI displayed on the display 24. This causes the locking/unlocking device 11 to operate via the key unit 12 as described above for locking or unlocking the vehicle 10.

Next, with reference to FIG. 4, a specific example of the operation of locking/unlocking system 1 in this embodiment will be described.

FIG. 4 is a sequence diagram showing an example of the operation of locking/unlocking system 1 in this embodiment.

First, steps S402 to S410 represent a series of operations from the time the use of the vehicle 10 is reserved to the time the BLE authentication information is sent to the portable terminal 20.

In step S402, the use reservation unit 234 of the portable terminal 20 makes a use reservation for the vehicle 10 in response to an input from the user on the GUI displayed on the display 24. As a result, the schedule information on the vehicle 10, stored in the schedule information DB 423 of the reservation management server 40, is updated and, as described above, the new use reservation is added to the schedule information on the vehicle 10.

In step S404, the schedule information acquisition unit 323 of the center server 30 sends the signal that requests the disclosure of the schedule information on the vehicle 10 to the management server 40 via the communication processing unit 321 at a predetermined time after the processing in step S402.

In step S406, the schedule management unit 422 of the reservation management server 40 returns the schedule information (reference data) on the vehicle 10 via the communication processing unit 421.

In step S408, the vehicle use management unit 322 of the center server 30 confirms the schedule information on the vehicle 10 acquired by the schedule information acquisition unit 323. Then, the vehicle use management unit 322 knows that the new use reservation, corresponding to the process of step S402, has been added to the schedule information on the vehicle 10.

In step S410, the vehicle use management unit 322 of the center server 30 sends the BLE authentication information, corresponding to the key unit 12 arranged inside the vehicle 10, to the portable terminal 20 through the communication processing unit 321. As a result, the portable terminal 20 can acquire the BLE authentication information.

The vehicle use management unit 322 may send the BLE authentication information to the portable terminal 20 immediately before (for example, 10 minutes before) the use start date and time of the vehicle 10. This reduces the possibility that the user will unlock the vehicle 10 and use the vehicle 10 before the use start date and time of the vehicle 10.

Next, steps S412 to S422 represent a series of operations when the user starts using the vehicle 10.

In step S412, the locking/unlocking request unit 233 of the portable terminal 20 sends the signal that requests permission to use the vehicle 10 to the center server 30 via the second communication processing unit 232 in response to a user's predetermined operation on the GUI displayed on the display 24.

In step S414, the vehicle use management unit 322 of the center server 30 sends the use permission signal to the portable terminal 20 via the communication processing unit 321. As a result, the locking/unlocking request unit 233 of the portable terminal 20 receives the use permission signal via the second communication processing unit 232.

Note that the processing flow may be performed in such a way that the BLE authentication information received by the portable terminal 20 in the processing of step S410 is encrypted and that the encrypted BLE information is decrypted using the use permission signal received by the portable terminal 20 in the processing of step S414. This processing flows reduces the possibility that the user will unlock the vehicle 10 and use the vehicle 10 before the use start date and time of the vehicle 10.

In step S416, the locking/unlocking request unit 233 of the portable terminal 20 sends the unlock request, which includes the BLE authentication information, to the key unit 12 in response to a user's predetermined operation on the GUI displayed on the display 24. As a result, the communication processing unit 1243 of the key unit 12 receives the unlock request.

In step S418, the authentication processing unit 1244 of the key unit 12 performs authentication based on the BLE authentication information included in the unlock request and, if the authentication is successful, turns on the power of the key unit 12.

In step S420, the authentication processing unit 1244 of the key unit 12 sends the sending request to the RF sending processing unit 1242 and, in response to the sending request, the RF sending processing unit 1242 sends the unlock signal that includes the restored key information to the locking/unlocking device 11. As a result, the RF reception processing unit 1132 of the locking/unlocking device 11 receives the unlock signal.

In step S422, the authentication processing unit 1133 of the locking/unlocking device 11 performs authentication based on the key information included in the unlock signal and, if the authentication is successful, the locking/unlocking control unit 1134 drives the door locking motor 115 via the body ECU 114 to unlock the door of the vehicle 10. As a result, the user of the portable terminal 20 can get on the vehicle 10 and use the vehicle 10.

Next, steps S424 to S438 represent a series of operations when the use of the vehicle 10 is ended.

In step S424, the locking/unlocking request unit 233 of the portable terminal 20 sends the lock request, which includes the BLE authentication information, to the key unit 12 in response to a user's predetermined operation on the GUI displayed on the display 24. As a result, the communication processing unit 1243 of the key unit 12 receives the lock request.

In step S426, the authentication processing unit 1244 of the key unit 12 performs authentication based on the BLE authentication information included in the lock request.

If the authentication is successful, the authentication processing unit 1244 of the key unit 12 sends the sending request to the RF sending processing unit 1242 in step S428 and, in response to the sending request, the RF sending processing unit 1242 sends the lock signal that includes the restored key information to the locking/unlocking device 11. As a result, the RF reception processing unit 1132 of the locking/unlocking device 11 receives the lock signal.

In step S430, the authentication processing unit 1133 of the locking/unlocking device 11 performs authentication based on the key information included in the lock signal and, if the authentication is successful, the locking/unlocking control unit 1134 drives the door locking motor 115 via the body ECU 114 to lock the door of the vehicle 10.

On the other hand, after sending the lock signal to the locking/unlocking device 11 via the RF sending processing unit 1242, the authentication processing unit 1244 of the key unit 12 sends the sending request to the communication processing unit 1243 in step S432 and, then, the communication processing unit 1243 sends the lock notification to the portable terminal 20.

After sending the lock notification to the portable terminal 20 via the communication processing unit 1243, the authentication processing unit 1244 of the key unit 12 turns off the power of the key unit 12 in step S434.

In step S436, the authentication information erasing unit 235 of the portable terminal 20 erases the BLE authentication information in the storage unit 236 when the use end date and time has elapsed.

In step S438, the authentication information erasing unit 235 of the portable terminal 20 sends the sending request to the second communication processing unit 232. In response to the sending request, the second communication processing unit 232 sends the use end notification to the center server 30.

As described above, in this embodiment, the portable terminal 20 sends the lock request (or an unlock request), which includes the BLE authentication information associated with the key unit 12, to the key unit 12 arranged in the interior of the vehicle 10. If the authentication based on the BLE authentication information included in the received lock request (or unlock request) is successful, the key unit 12 sends the lock signal (or the unlock signal), which includes the key information associated with the vehicle 10, to the locking/unlocking device 11. If the authentication based on the key information included in the received lock signal (or unlock signal) is successful, the locking/unlocking device 11 locks (or unlocks) the vehicle 10. Therefore, by acquiring the BLE authentication information in advance, the user can lock or unlock the vehicle 10 using the user's own portable terminal 20. This saves time and effort for handing over the electronic key, thus improving user convenience.

In addition, in this embodiment, the key information associated with the vehicle 10 and stored in the key unit 12, that is, the key information unique to the vehicle 10, is usually encrypted or inaccessible. Therefore, even if a malicious third party illegally obtains only the key unit 12, it is difficult to use it for locking or unlocking the vehicle 10, meaning that the possibility of vehicle theft is reduced. Furthermore, the BLE authentication information sent from the portable terminal 20 to the key unit 12 is associated with the key unit 12 but not with the vehicle 10. Therefore, even if the BLE authentication information is leaked to the outside world from the center server 30, it is necessary to identify not only the correspondence between the BLE authentication information and the key unit 12 but also the correspondence between the key unit 12 and the vehicle 10 (which key unit 12 belongs to which vehicle 10), thus reducing the possibility of vehicle theft.

In addition, in this embodiment, the locking/unlocking device 11, one of the components included in the vehicle 10, has an existing configuration, meaning that the vehicle 10 can be locked/unlocked from the portable terminal 20 by simply arranging the key unit 12 in the interior of the vehicle 10. That is, without modifying the vehicle or changing the design of the vehicle, the vehicle 10 can be locked or unlocked by simply adding the key unit 12, by using the portable terminal 20, which has been authenticated by the center server 30. This reduces the initial investment when starting a service such as car sharing.

In addition, in this embodiment, the center server 30 (vehicle use management unit 322) sends the BLE authentication information to the portable terminal 20 of the user who has reserved the vehicle, based on the vehicle schedule information acquired by the schedule information acquisition unit 323. Therefore, if the use of the vehicle 10 is reserved, the user does not have to perform the operation to acquire the BLE authentication information and, thus, user convenience can be improved.

In addition, in this embodiment, the schedule information acquired by the center server 30 (the schedule information acquisition unit 323) is set from the portable terminal 20 or another terminal using cloud applications that are executed by the reservation management server 40 and are available via the web. Therefore, the user of the portable terminal 20 can automatically acquire the BLE authentication information by simply writing the vehicle schedule information from the portable terminal 20 or another terminal using a web application and, thus, user convenience can be improved.

In addition, in this embodiment, a general-purpose schedule management server operated by a third party may be used as the reservation management server 40. Using such a server eliminates the need for providing a dedicated reservation management function and therefore reduces the initial investment when starting a service such as car sharing. Furthermore, in some cases, the schedule of employees, equipment, and so on is managed in a company by a schedule management application (cloud application) associated with a general-purpose schedule management server provided by a third party. Therefore, in such a case, providing a system that can manage the schedule information on the company cars using the same general-purpose schedule management server makes it easier for the company to install the locking/unlocking system 1 according to this embodiment.

Second Embodiment

Next, a second embodiment will be described.

A locking/unlocking system 1A according to this embodiment mainly differs from that in the first embodiment in that the schedule information on a vehicle 10 is not managed (the reservation management server 40 is not provided) and in that a center server 30A specializes in the provision function of the BLE authentication information in response to a request from the portable terminal 20. In the description below, the same reference numerals are given to the same configurations as those in the first embodiment, and the description will be made with focus on the parts different from the first embodiment.

FIG. 5 is a block diagram generally showing an example of a configuration of the locking/unlocking system 1A in this embodiment. The locking/unlocking system 1A includes a vehicle 10, a portable terminal 20A, and a center server 30A. In addition, the locking/unlocking system 1A includes a third party server 50A as a component related to the locking/unlocking system 1A.

Since the configuration of a locking/unlocking device 11 and a key unit 12 included in the vehicle 10 is the same as that in the first embodiment and is shown in FIG. 2, the description thereof will be omitted.

The portable terminal 20A includes communication devices 21 and 22, a processing device 23A and a display 24.

The processing device 23A, which includes a CPU and an auxiliary storage device, includes a first communication processing unit 231, a second communication processing unit 232A, a locking/unlocking request unit 233A, a third party application unit 234A, and an authentication information erasing unit 235 each as a functional unit implemented by executing one or more programs on the CPU. In addition, the processing device 23A includes a storage unit 236 implemented as a storage area in the auxiliary storage device.

The second communication processing unit 232A uses the communication device 22 to wirelessly communicate with a base station for sending and receiving various signals such as data signals and control signals. In this embodiment, the second communication processing unit 232A sends and receives various signals to and from the center server 30A and the third party server 50A through a mobile phone network with base stations as its terminals and the Internet. For example, in response to a request from the locking/unlocking request unit 233A, the second communication processing unit 232A sends the signal that requests the BLE authentication information to the center server 30A and, at the same time, receives the signal that includes the BLE authentication information from the center server 30A. The BLE authentication information received by the second communication processing unit 232A is stored in the storage unit 236. In addition, in response to a request from the locking/unlocking request unit 233A, the second communication processing unit 232A sends the signal that requests permission to use the vehicle 10 to the center server 30A and, at the same time, receives the signal that permits the use of the vehicle 10 from the center server 30A. In addition, in response to a request from the third party application unit 234A, the second communication processing unit 232A sends the signal that requests the disclosure of the schedule information on the vehicle 10 to the third party server 50A and, at the same time, receives the schedule information on the vehicle 10 as the reference data from the third party server 50A. In addition, in response to a request from the third party application unit 234A, the second communication processing unit 232A sends the signal that requests the update of the schedule information on the vehicle 10 and, at the same time, receives a reply, which indicates that the update of the schedule information on the vehicle 10 is completed, from the third party server 50A.

The locking/unlocking request unit 233A sends a lock request (first request) that includes the BLE authentication information, or an unlock request (first request) that includes the BLE authentication information, to the key unit 12 via the first communication processing unit 231 in response a predetermined operation (second operation) on the GUI displayed on the display 24 as the operation screen. For example, the Locking button for requesting the locking, and the Unlocking button for requesting the unlocking, of the vehicle 10 are drawn on the GUI of the display 24. The lock request is sent by touching the Locking button, and the unlock request is sent by touching the Unlocking button.

In addition, in response to a predetermined operation (first operation) on the GUI, the locking/unlocking request unit 233A sends the signal (authentication information request signal) that requests the BLE authentication information to the center server 30A via the second communication processing unit 232A. For example, the input fields for entering the user's identification information, password, and use date and time of the vehicle 10 for use reservation, and the Send button are drawn on the GUI of the display 24. The authentication information request signal is sent to the center server 30A by entering the necessary items and then touching the Send button.

The information on the use reservation date and time of the vehicle 10 may be automatically entered based on the function of the third party application unit 234A provided for reserving the vehicle 10.

In this embodiment, the function of the locking/unlocking request unit 233A is incorporated into the third party application unit 234A, for example, in the form of a Software Development Kit (SDK) that will be described later. Therefore, the GUI for implementing the function of the locking/unlocking request unit 233A is displayed on the display 24 by the third party application unit 234A. When an above-described predetermined operation (first operation or second operation) is performed on the GUI, the locking/unlocking request unit 233A is called from the third party application unit 234A to implement each function of the locking/unlocking request unit 233A described above. That is, when a user's predetermined operation (first operation) is performed on the GUI during the execution of the third party application unit 234A, the locking/unlocking request unit 233A is called from the third party application unit 234A to send an authentication information request signal to the center server 30A. In addition, when a user's predetermined operation (second operation) is performed on the GUI during the execution of the third party application unit 234A, the locking/unlocking request unit 233A is called from the third party application unit 234A to send a lock request or an unlock request to the key unit 12.

The third party application unit 234A is a functional unit implemented by executing a predetermined application program (third party application program) installed in the portable terminal 20A. The third party application unit 234A communicates with the third party server 50A through the second communication processing unit 232A to provide a predetermined service different from the locking/unlocking function of the vehicle 10 (for example, use reservation service for the vehicle 10 in car sharing, settlement service in car sharing etc.). For example, the third party application unit 234A causes the display 24 to display the GUI as the operation screen and, in response to a user's predetermined operation on the GUI, carries out two-way communication with the third party server 50A to make a use reservation for the vehicle 10. As a specific method of the use reservation for the vehicle 10, the method based on the two-way communication between the use reservation unit 234 and the reservation management server 40 in the first embodiment may be used. In addition, in response to a user's predetermined operation on the GUI, the third party application unit 234A carries out two-way communication with the third party server 50A to perform the settlement processing for using the vehicle 10.

The third party application unit 234A may be replaced by a similar functional unit implemented by a program provided, not by a third party, that is, a third party different from the user's own organization providing the programs for implementing the locking/unlocking request unit 233A and for managing the center server 30A, but by the user's own organization. In such a case, the third party server 50A is replaced by a service provision server managed by the user's own organization.

The center server 30A manages the use status of the vehicle 10. The center server 30A includes a communication device 31 and a management device 32A.

The management device 32A, configured mainly by one or more computers, includes a communication processing unit 321A and a vehicle use management unit 322A each as a functional unit implemented by executing one or more programs on the CPU. In addition, the management device 32 includes a user information DB 324 and an authentication information DB 325 stored in the internal auxiliary storage device.

The communication processing unit 321A uses the communication device 31 to send and receive various signals to and from the portable terminal 20A. For example, the communication processing unit 321A receives the signal (authentication information request signal) that requests the BLE authentication information from the portable terminal 20A and, in response to a request from the vehicle use management unit 322 corresponding to that signal, sends the signal that includes the BLE information to the portable terminal 20A. In addition, the communication processing unit 321A receives the signal that requests permission to use the vehicle 10 from the portable terminal 20A and, in response to a request from the vehicle use management unit 322 corresponding to that signal, sends the use permission signal of the vehicle 10 to the portable terminal 20A.

The vehicle use management unit 322A sends the BLE authentication information to the portable terminal 20A via the communication processing unit 321A in response to the authentication information request signal that the communication processing unit 321A receives from the portable terminal 20A. For example, the vehicle use management unit 322A verifies whether the user's identification information and password, included in the authentication information request signal, match the user's identification information and password registered in the user information DB 324 in advance. If they match, the vehicle use management unit 322 determines that user is an authorized user and retrieves the BLE authentication information, corresponding to the key unit 12 mounted on the vehicle 10, from the authentication information DB 325. In addition, the vehicle use management unit 322A extracts the use end date and time based on the information on the use reservation date and time of the vehicle 10 included in the authentication information request signal. Then, the vehicle use management unit 322A sends the signal that includes the BLE authentication information and the use date and time expiration information (use end date and time of the vehicle 10) of the BLE authentication information to the portable terminal 20A via the communication processing unit 321A.

Next, an outline of the operation of the locking/unlocking system 1A in this embodiment will be described with reference to FIG. 6.

In FIG. 6, in order to conceptually describe the exchange of signals among the main components, the hardware (communication devices 21, 22, and 31) and the software (first communication processing unit 231, second communication processing unit 232A, and communication processing unit 321A) for implementing the communication function are omitted.

In step S601, in response to a user's predetermined operation on the GUI displayed on the display 24, the third party application unit 234A carries out two-way communication with the third party server 50A to make a use reservation for the vehicle 10.

In step S602, when a predetermined operation (first operation) on the GUI is performed, the third party application unit 234A calls the locking/unlocking request unit 233A that is installed in the portable terminal 20A in the form it is incorporated in the third party application unit 234A as an SDK.

In step S603, the SDK (the locking/unlocking request unit 233A) sends the signal (authentication information request signal) that requests the BLE authentication information to the vehicle use management unit 322A using an API 327 that calls the vehicle use management unit 322A. As a result, the vehicle use management unit 322A is called. The vehicle use management unit 322A verifies whether the user's identification information and password, included in the authentication information request signal, match the identification information and password registered in advance in the user information DB 324. If they match, the vehicle use management unit 322A retrieves the BLE authentication information, corresponding to the key unit 12 arranged inside the vehicle 10, from the authentication information DB 325 and sends the retrieved BLE authentication information to the SDK (locking/unlocking request unit 233A) using the API 327. In this way, the BLE authentication information is stored in the storage unit 236.

Note that, even if the locking/unlocking request unit 233A provided as an SDK is called, the execution of the third party application unit 234A is continued on the portable terminal 20A and the GUI, displayed by the third party application unit 234, remains displayed on the display 24.

In step S604, when a user's predetermined operation (second operation) is performed on the GUI, the third party application unit 234A calls the SDK (the locking/unlocking request unit 233A).

In step S605, the SDK (the locking/unlocking request unit 233A) sends a lock request or an unlock request that includes the BLE authentication information to the key unit 12. As a result, without leaving the GUI displayed by the third party application unit 234A, the user can operate the locking/unlocking device 11 via the key unit 12 as described above for locking or unlocking the vehicle 10.

Next, a specific example of the operation of the locking/unlocking system 1A in this embodiment will be described with reference to FIG. 7.

FIG. 7 is a sequence diagram showing an example of the operation of the locking/unlocking system 1A in this embodiment.

Since steps S710 to S720 and steps S722 to S736, which represent a series of operations at the start and at the end of use of the vehicle 10, are similar to steps S412 to S422 and steps S424 to S438 in FIG. 4, respectively, the description is omitted.

Steps S702 to S708 represent a series of operations from the time a use reservation for the vehicle 10 is made to the time the BLE authentication information is sent to the portable terminal 20A.

In step S702, the third party application unit 234A of the portable terminal 20A is started in response to a user's predetermined operation (for example, a touch operation on the icon of the third party application displayed on the display 24).

In step S704, in response to a predetermined operation on the GUI displayed on the display 24, the third party application unit 234A of the portable terminal 20A performs two-way communication with the third party server 50A to make a use reservation for the vehicle 10.

In step S706, the third party application unit 234A of the portable terminal 20A calls the locking/unlocking request unit 233A in response to a predetermined operation (first operation) on the GUI displayed on the display 24. Then, the called locking/unlocking request unit 233A sends the signal (authentication information request signal) that requests the BLE authentication information to the center server 30A. As a result, the center server 30A receives the authentication information request signal.

In step S708, the third party application unit 234A of the center server 30A authenticates the user based on the user's identification information and password included in the authentication information request signal and, then, sends the BLE authentication information, corresponding to the key unit 12 arranged inside the vehicle 10, to the portable terminal 20A.

As described above, in this embodiment, the third party application unit 234A communicates with the third party server 50A, different from the center server 30A, to provide a predetermined service (use reservation service of the vehicle 10). When a predetermined operation (first operation) is performed on the GUI displayed on the display 24 during execution of the third party application unit 234A, the locking/unlocking request unit 233A is called from the third party application unit 234A to send the authentication information request signal to the center server 30A via the second communication processing unit 232A. Similarly, the locking/unlocking request unit 233A is called from the third party application unit 234A during execution of the third party application unit 234A to receive the BLE authentication information from the center server 30 via the second communication processing unit 232A. In addition, when a predetermined operation (second operation) is performed on the GUI displayed on the display 24 during execution of the third party application unit 234A, the locking/unlocking request unit 233A is called from the third party application unit 234A to send the lock request (second signal) or the unlock request (second signal), which includes the BLE authentication information received from the center server 30A, to the vehicle 10 (key unit 12) via the first communication processing unit 231A. Therefore, for example, when there is already a third party that provides services such the use reservation service and the settlement service used in car sharing, the locking/unlocking system in this embodiment can realize car sharing while specializing in providing the function for locking and unlocking the vehicle 10 using the portable terminal 20A, thus reducing the cost and the initial investment. In addition, the system in this embodiment, which can attract a user who uses a third-party application, makes it easier for the user to start business quickly, for example, when the user wants to start the car-sharing business. In addition, since the portable terminal 20A is configured to acquire the first authentication information, not from the third party server 50A, but from the center server 30A of the user's own organization, the first authentication information can be provided to the portable terminal 20A without disclosing the first authentication information to a third party. Furthermore, in some cases, it is unnecessary to strictly manage the use reservation, for example, when vehicles are lent and borrowed between users using a communication application. Therefore, by installing the locking/unlocking request unit 233A in the portable terminal 20A in the form it is incorporated in a communication application so that the BLE authentication information can be acquired from the center server 30A, the user can lend and borrow vehicles freely without exchanging electronic keys.

In this embodiment, the portable terminal 20A (locking/unlocking request unit 233A) requests the center server 30A, different from the third party server 50A to which the third party application unit 234A is connected, to send the BLE authentication information in response to a call from the third party application unit 234A that is an existing application. Then, the portable terminal 20A (the second communication processing unit 232A) receives the BLE authentication information from the center server 30A. Therefore, since the BLE authentication information is stored in the center server 30A different from the third party server 50A to which an existing application connected and is managed according to a dedicated security policy, the leakage of the BLE authentication information to the outside world can be reduced. In this embodiment, when the BLE authentication information is sent to the portable terminal 20A in response to the authentication information request signal from the portable terminal 20A, the center server 30A authenticates the user based on the identification information on the user of the portable terminal 20A included in the authentication information request signal. Therefore, even when an access is made to the center server 30A via a third party application, security can be maintained.

Although the mode for carrying out the present disclosure has been described in detail above, the present disclosure is not limited to such specific embodiments but various modifications and changes are possible.

For example, though the subject of locking/unlocking and use reservation is a vehicle in the above-described embodiments, the present disclosure is not limited to a vehicle if the subject is available to a plurality of users in different time zones and can be locked/unlocked. In other words, the vehicle that is the subject of locking/unlocking and use reservation in the above-described embodiments may be replaced with facilities capable of being locked and unlocked such as a conference room, a recreation center, a gymnasiums, and the like. This makes it possible to reduce the possibility of illegal invasion into facilities while improving the convenience of the users who use the facilities as in the above-described embodiments.

In addition, though the reservation management server 40 is provided separately from the center server 30 in the above-described first embodiment, the function of the reservation management server 40 may be included in the center server 30.

What is claimed is:

1. A locking and unlocking system comprising:
   a portable terminal;
   a key unit arranged inside a vehicle or facilities; and
   a locking and unlocking device installed in the vehicle or the facilities, wherein
   the portable terminal includes a first sending unit configured to send a first request to the key unit, the first request including first authentication information associated with the key unit,
   the key unit includes:
      a first receiving unit configured to receive the first request from the portable terminal;
      a first storage unit configured to store encrypted second authentication information, the second authentication information being associated with the vehicle or the facilities;
      a first authentication unit configured to perform authentication based on the first authentication information included in the first request when the first receiving unit receives the first request;
      a decryption unit configured to decrypt the second authentication information when the authentication by the first authentication unit is successful; and
      a second sending unit configured to send a second request to the locking and unlocking device, the second request including the second authentication information decrypted by the decryption unit, and
   the locking and unlocking device includes:
      a second receiving unit configured to receive the second request from the key unit;
      a second authentication unit configured to perform authentication based on the second authentication information included in the second request, when the second receiving unit receives the second request; and
      a locking and unlocking unit configured to lock or unlock the vehicle or the facilities when the authentication by the second authentication unit is successful.

2. The locking and unlocking system according to claim 1, further comprising:
   a server configured to communicate with the portable terminal, wherein
   the server includes:
      a second storage unit configured to store the first authentication information;
      a schedule information acquisition unit configured to acquire schedule information on the vehicle or the facilities; and
      a third sending unit configured to send the first authentication information to the portable terminal when the schedule information includes a use reservation for the vehicle or the facilities by a user of the portable terminal.

3. The locking and unlocking system according to claim 1, wherein
   the portable terminal further includes:
      a third storage unit configured to store the first authentication information; and
      an erasing unit configured to erase the first authentication information stored in the third storage unit, when a time of a use of the vehicle or the facilities ends.

4. The locking and unlocking system according to claim 2, wherein the portable terminal further includes:
   a third storage unit configured to store the first authentication information; and
   an erasing unit configured to erase the first authentication information stored in the third storage unit, when a time of a use of the vehicle or the facilities ends.

5. A locking and unlocking system comprising:
   a portable terminal;
   a key unit arranged inside a vehicle or facilities; and
   a locking and unlocking device installed in the vehicle or the facilities, wherein
   the portable terminal includes a first sending unit configured to send a first request to the key unit, the first request including first authentication information associated with the key unit,
   the key unit includes:
      a first receiving unit configured to receive the first request from the portable terminal;
      a first storage unit configured to store second authentication information associated with the vehicle or the facilities;
      a first authentication unit configured to perform authentication based on the first authentication information included in the first request when the first receiving unit receives the first request;
      an access management unit configured to change the second authentication information in the first storage unit from an inaccessible state to an accessible state, when the authentication by the first authentication unit is successful; and a second sending unit configured to send a second request to the locking and unlocking device, the second request including the second authentication information, and the locking and unlocking device includes:

a second receiving unit configured to receive the second request from the key unit;

a second authentication unit configured to perform authentication based on the second authentication information included in the second request, when the second receiving unit receives the second request; and a locking and unlocking unit configured to lock or unlock the vehicle or the facilities when the authentication by the second authentication unit is successful.

6. The locking and unlocking system according to claim 5, further comprising:

a server configured to communicate with the portable terminal, wherein the server includes:

a second storage unit configured to store the first authentication information;

a schedule information acquisition unit configured to acquire schedule information on the vehicle or the facilities; and a third sending unit configured to send the first authentication information to the portable terminal when the schedule information includes a use reservation for the vehicle or the facilities by a user of the portable terminal.

7. The locking and unlocking system according to claim 5, wherein the portable terminal further includes:

a third storage unit configured to store the first authentication information; and an erasing unit configured to erase the first authentication information stored in the third storage unit, when a time of a use of the vehicle or the facilities ends.

8. A key unit that is arranged inside a vehicle or facilities and sends a second request to a locking and unlocking device in response to a first request sent from a portable terminal to lock or unlock the vehicle or the facilities, the locking and unlocking device being installed in the vehicle or the facilities, the second request requesting the locking or the unlocking of the vehicle or the facilities, the key unit comprising:

a receiving unit configured to receive the first request from the portable terminal, the first request including first authentication information;

a storage unit configured to store encrypted second authentication information, the second authentication information being associated with the vehicle or facilities;

an authentication unit configured to perform authentication based on the first authentication information included in the first request when the receiving unit receives the first request;

a decryption unit configured to decrypt the second authentication information when the authentication by the authentication unit is successful; and a sending unit configured to send the second request to the locking and unlocking device, the second request including the second authentication information decrypted by the decryption unit.

9. The key unit according to claim 8, wherein
the key unit is removable from the vehicle or the facilities.

10. A key unit that is arranged inside a vehicle or facilities and sends a second request to a locking and unlocking device in response to a first request sent from a portable terminal to lock or unlock the vehicle or the facilities, the locking and unlocking device being installed in the vehicle or the facilities, the second request requesting the locking or the unlocking of the vehicle or the facilities, the key unit comprising:

a receiving unit configured to receive the first request from the portable terminal, the first request including first authentication information;

a storage unit configured to store second authentication information, the second authentication information being associated with the vehicle or facilities;

an authentication unit configured to perform authentication based on the first authentication information included in the first request when the receiving unit receives the first request;

an access management unit configured to change the second authentication information in the storage unit from an inaccessible state to an accessible state when the authentication by the authentication unit is successful; and a sending unit configured to send a second request to the locking and unlocking device, the second request including the second authentication information.

11. The key unit according to claim 10, wherein
the key unit is removable from the vehicle or the facilities.

* * * * *